(12) United States Patent
Aradachi et al.

(10) Patent No.: US 7,439,708 B2
(45) Date of Patent: Oct. 21, 2008

(54) BATTERY CHARGER WITH CONTROL OF TWO POWER SUPPLY CIRCUITS

(75) Inventors: Takao Aradachi, Hitachinaka (JP); Kazuhiko Funabashi, Hitachinaka (JP); Nobuhiro Takano, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 11/131,359

(22) Filed: May 18, 2005

(65) Prior Publication Data
US 2005/0258800 A1 Nov. 24, 2005

(30) Foreign Application Priority Data
May 18, 2004 (JP) ............................. P2004-148446

(51) Int. Cl.
*H02J 7/02* (2006.01)
(52) U.S. Cl. .................... 320/111; 320/140; 320/108
(58) Field of Classification Search ................. 320/111, 320/108, 140
See application file for complete search history.

(56) References Cited

U.S. PATENT DOCUMENTS

2004/0075417 A1* 4/2004 Aradachi et al. ............ 320/107
2004/0108834 A1* 6/2004 Takano et al. ............... 320/120

FOREIGN PATENT DOCUMENTS

| JP | 62-193518 | 8/1987 |
|---|---|---|
| JP | 02-246739 | 10/1990 |
| JP | 03-034638 | 2/1991 |
| JP | 2003-116230 | 4/2003 |

* cited by examiner

*Primary Examiner*—Adolf Berhane
*Assistant Examiner*—Aaron Piggush
(74) *Attorney, Agent, or Firm*—Antonelli, Terry, Stout & Kraus, LLP.

(57) ABSTRACT

To reduce power consumption when charging a secondary battery is not performed, a first power supply circuit is disabled but a second power supply circuit is enabled when the secondary battery is unloaded from a battery charger. Both the first and second power supply circuits are enabled when the battery is loaded in the charger. The first power supply circuit is provided for supplying power to the secondary battery. The second power supply circuit is provided for supplying a first voltage to such components that are operated with the first voltage and a second voltage to such components that are operated with the second voltage, wherein the second voltage is greater than the first voltage. When the battery is unloaded from the charger, the second power supply circuit supplies only the first voltage whereas when the battery is loaded in the charger, the second power supply circuit supplies the first and second voltages to the corresponding components.

7 Claims, 2 Drawing Sheets

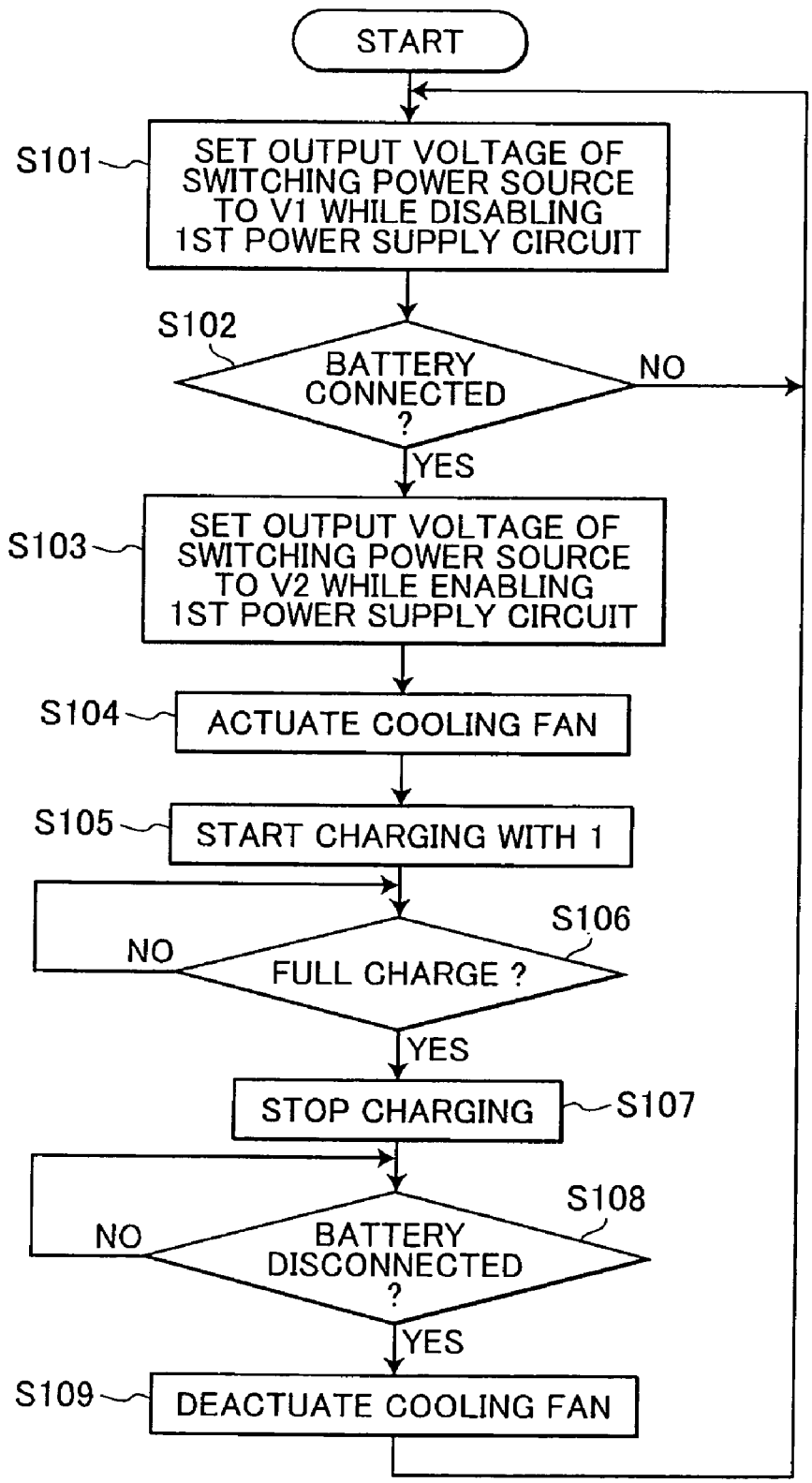

BATTERY CHARGER WITH CONTROL OF TWO POWER SUPPLY CIRCUITS

BACKGROUND OF THE INVENTION

1. Field of the Invention

This invention relates to a battery charger for charging secondary batteries.

2. Description of the Related Art

Various types of battery chargers have been used in charging secondary batteries such as nickel-cadmium batteries, nickel-metal hydride batteries, or lithium-ion batteries. Japanese Patent Application Publication No. 2003-116230 proposes reducing power consumption when charging the battery is not performed. According to the above-noted publication, when charging the battery is not performed, power is not supplied to the battery, a charge control circuit is disabled, and light indicators are turned off. However, with the battery charger described above, because the charge control circuit is disabled, the status of the charger cannot be displayed.

SUMMARY OF THE INVENTION

An object of this invention is to solve the above-mentioned problems and to provide a battery charger that reduces power consumption when charging the battery is not performed.

In order to achieve the above and other objects, there is provided a battery charger that includes a pair of connection terminals across which a secondary battery is connected, a first power supply circuit, a second power supply circuit, a first component, a second component, and a control section. The first power supply circuit is connected to the pair of connection terminals and supplies power to the secondary battery. The first component is operable when applied with a first voltage and the second component is operable when applied with a second voltage wherein the second voltage is greater than the first voltage. The second power supply circuit produces the first voltage to be applied to the first component and the second voltage to be applied to the second component. The control section controls both the first power supply circuit and the second power supply circuit so that the first power supply circuit is disabled but the second power supply circuit is enabled when the secondary battery is not connected across the pair of connection terminals, and that both the first power supply circuit and the second power supply circuit are enabled when the secondary battery is connected across the pair of connection terminals. The second power supply circuit produces the first voltage when the secondary battery is not connected across the pair of connection terminals, and produces the first and second voltages when the secondary battery is connected across the pair of connection terminals.

Preferably, the control section includes a microcomputer wherein the second power supply circuit supplies power to the microcomputer to allow the latter to operate when the secondary battery is not connected across the pair of connection terminals.

The battery charger may be configured so that the second power supply circuit generates only the first voltage in response to a first instruction from the control section, and generates the first and second voltages in response to a second instruction from the control section.

The second power supply circuit may be configured to include a switching power source controlled to selectively provide a first output and a second output in response to the first instruction and the second instruction from the control section, respectively, a first voltage generating circuit that generates the first voltage in response to the first and second outputs, and a second voltage generating circuit that generates the second voltage in response to the second output.

Preferably, the first voltage generating circuit is configured from a 3-terminal regulator having an input terminal, output terminal, and ground terminal wherein the input terminal is connected to the switching power source and the output terminal outputs the first voltage.

The switching power source includes a transformer having a primary winding and a secondary winding, and a switching device connected to the control section to selectively receive the first and second instructions therefrom and also connected in series to the primary winding of the transformer so that the switching device performs on/off switching actions corresponding to the first and second instructions.

The control section may be configured from a tertiary winding magnetically coupled to the primary winding of the transformer.

The control section may include a battery connection detecting circuit that detects the secondary battery connected across the pair of connection terminals.

According to another aspect of the invention, there is provided a battery charger that includes a pair of connection terminals, a first power supply circuit, a first component, a second component, a second power supply circuit, and a third power supply circuit. The pair of connection terminals is provided for connecting a secondary battery thereacross. The first power supply circuit is connected to the pair of connection terminals and supplies power to the secondary battery. The first power supply circuit is enabled when powered whereas disabled when not powered. The first component is operable when applied with a first voltage, and the second component is operable when applied with a second voltage greater than the first voltage. The second power supply circuit produces the first voltage to be applied to the first component and the second voltage to be applied to the second component. The third power supply circuit does not power the first power supply circuit when the second power supply circuit produces the first voltage but powers the first power supply circuit when the second power supply circuit produces the second voltage.

BRIEF DESCRIPTION OF THE DRAWINGS

In the accompanying drawings:

FIG. 2 is a flowchart illustrating the operation of the battery charger according to the embodiment of the invention.

DETAILED DESCRIPTION OF THE PREFERRED EMBODIMENTS

Figure 1:
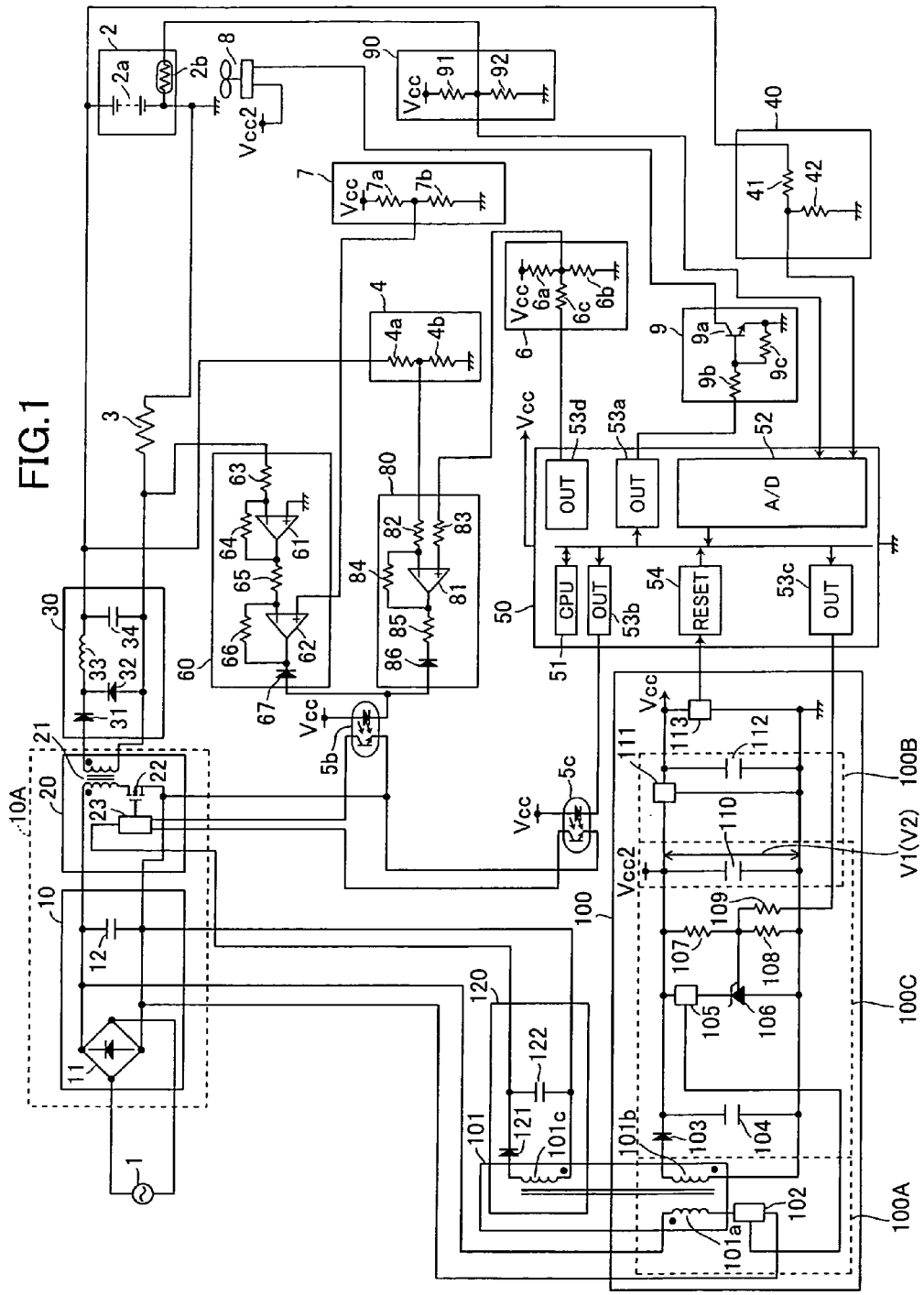
FIG. 1 is a circuit diagram showing the configuration of a battery charger according to an embodiment of the invention.

A battery charger according to a preferred embodiment of the invention will be described with reference to the accompanying drawings. FIG. 1 is a schematic diagram showing a configuration of the battery charger. In use, the battery charger is connected to an AC power supply 1 and a battery pack 2 is loaded in the battery charger. As shown in FIG. 1, a pair of connection terminals is provided for connection of the battery pack 2 thereacross. The battery pack 2 includes a plurality of cells 2a connected in series, and a thermistor 2b serving as a temperature sensing element. The battery cells used in the battery pack 2 can either be a nickel-cadmium battery or nickel-metal hydride battery, or lithium-ion battery.

The battery charger includes a first power supply circuit 10A for charging the battery pack 2. The first power supply circuit 10A is configured from a rectifying/smoothing circuit 10 and a switching circuit 20. The rectifying/smoothing circuit 10 is connected, in use, to the AC power supply 1 and includes a full-wave rectifier 11 and a smoothing capacitor 12. The switching circuit 20 is connected to the output of the full-wave rectifier 11 and includes a high-frequency transformer 21, a MOSFET 22, and a PWM control IC 23.

A rectifying/smoothing circuit 30 is connected to a secondary winding of the high-frequency transformer 21 and includes diodes 31, 32, a choke coil 33, and a smoothing capacitor 34. The battery pack 2 is connected to the output of the rectifying/smoothing circuit 30 and charged by the power generated therefrom.

The battery charger includes a resistor 3 and a charging current control circuit 60. The resistor 3 serves as a current detector and is connected to the battery pack 2 for detecting a charging current flowing in the battery pack 2.

The charging current control circuit 60 includes operational amplifiers 61 and 62, resistors 63 through 66, and a diode 67. The charging current detected by the charging current detecting resistor 3 is applied to the operational amplifier 61 by which the voltage corresponding to the charging current is subject to inverting amplification. The operational amplifier 62 amplifies the difference between the output voltage of the operational amplifier 61 and the reference voltage set by a charging current setting circuit 7 and feeds this difference back to the PWM control IC 23 via a photo-coupler 5b.

The charging current setting circuit 7 is configured from resistors 7a and 7b connected in series between the first supply voltage Vcc and ground. The voltage developed across the resistor 7b is applied as the reference voltage to the charging current control circuit 60. The charging current control circuit 60 compares the voltage corresponding to the charging current currently flowing in the battery pack 2 with the output voltage from the charging current setting circuit 7 indicative of the reference charging current.

A battery voltage detecting circuit 40 is provided for detecting a voltage across the terminals of the battery pack 2. The battery voltage detecting circuit 40 includes resistors 41 and 42 connected in series across the terminals of the battery pack 2. The voltage developed across the resistor 42 is applied to a microcomputer 50 via an A/D converter 52.

The battery charger also includes an output voltage control circuit 80 having an operational amplifier 81, resistors 82-85, and a diode 86. The operational amplifier 81 amplifies the difference between the voltage from an output voltage detecting circuit 4 and the voltage from an output voltage setting circuit 6 and feeds this difference back to the PWM control IC 23 via the photo-coupler 5b, whereby the output voltage of the secondary rectifying/smoothing circuit 30 is controlled.

The output voltage setting circuit 6 is configured from resistors 6a, 6b, 6c wherein the resistors 6a and 6b are connected in series between the first supply voltage Vcc and ground. The resistor 6c is connected between the output port 53d of the microcomputer 50 and the connection node between the resistors 6a and 6b.

The PWM control IC 23 switches the MOSFET 22 on and off in order to maintain the charging current at a constant level when the charging current control circuit 60 is in operation and to maintain the charging voltage at a constant level when the output voltage control circuit 80 is in operation. Specifically, in the case of constant current control, the pulse generated and applied to the high-frequency transformer 21 is varied between a narrow pulse width when the charging current is large and a wide pulse width when the charging current is small. The current is smoothed to a direct current by the rectifying/smoothing circuit 30 before being applied to the battery pack 2. Hence, the current detecting resistor 3, charging current control circuit 60, photo-coupler 5b, switching circuit 20, and rectifying/smoothing circuit 30 function to maintain the charging current of the battery pack 2 at the current level set by the charging current setting circuit 7.

The microcomputer 50 includes a CPU 51, A/D converter 52, output ports 53a, 53b, 53c, 53d and a reset input port 54. The microcomputer 50 is operated when a first supply voltage Vcc is applied. The output port 53b outputs a start/stop instruction signal to the PWM control IC 23 via a photo-coupler 5c to instruct the PWM control IC 23 to start and stop of charging.

The battery charger further includes a battery temperature detecting circuit 90. The circuit 90 is configured from resistors 91 and 92 connected in series between the first supply voltage Vcc and ground. The connection node of the resistors 91 and 92 is connected to the thermistor 2b and also to the A/D converter 52 of the microcomputer 50 so that the voltage developed across the resistor 92 is applied to the microcomputer 50. The voltage developed across the resistor 92 changes depending on the resistance of the thermistor 2b and is thus indicative of the temperature of the battery.

The battery charger is provided with a cooling fan 8 and a cooling fan driving circuit 9. The cooling fan 8 is disposed in a position adjacent to the battery pack 2 to cool the latter. The driving circuit 9 is configured from a transistor 9a, a resistor 9b connected between the base of the transistor 9a and the output port 53a, and a resistor 9c connected between the base and emitter of the transistor 9a. With this configuration, the cooling fan 8 is driven when a second supply voltage Vcc2 is supplied and a high level signal is output from the output port 53a of the microcomputer 50 to the driving circuit 9. The second supply voltage Vcc2 is set higher than the first supply voltage Vcc.

The battery charger further includes a second power supply circuit 100. The second power supply circuit 100 includes a switching power source, a first supply voltage generating circuit, and a second supply voltage generating circuit. The first supply voltage generating circuit produces the first supply voltage Vcc and second supply voltage generating circuit produces the second supply voltage Vcc2. The first supply voltage Vcc is supplied to the microcomputer 50, output voltage setting circuit 6, charging current setting circuit 7, battery temperature detecting circuit 90, and photo-couplers 5b and 5c. The second supply voltage Vcc2 is supplied to the fan driving circuit 9.

The second power supply circuit 100 includes a power source transformer 101 with a primary winding 101a and a secondary winding 101b, a switching device 102 connected in series to the primary winding 101a, a rectifying diode 103 connected to the positive line of the secondary winding 101b, and a smoothing capacitors 104 connected across the positive and negative lines of the secondary winding 101b.

The second power supply circuit 100 further includes a 3-terminal regulator 111, a smoothing capacitor 112, and a reset IC 113. The 3-terminal regulator 111 has an input terminal connected to the positive line of the secondary winding 101b, an output terminal from which the first supply voltage Vcc is produced, and a ground terminal connected to the negative line of the secondary winding 101b of the transformer 101. The reset IC 113 is connected between the output terminal of the 3-terminal regulator 111 and the negative lines of the secondary winding 101b and is also connected to the reset input port 54 of the microcomputer 50. The reset IC 113 outputs a reset signal to the reset input port 54 in order to reset the microcomputer 50 to an initialized state. The second power supply circuit 100 further includes a smoothing capacitor 110 connected between the positive and negative lines of the secondary winding 101b for producing the second supply voltage Vcc2.

The second power supply circuit 100 further includes resistors 107, 108 and 109, a shunt regulator 106, and a feedback unit (photo-couple) 105. The resistor 109 has one terminal connected to the output port 53c of the microcomputer 50 and another terminal connected to the connection node of the serially connected resistors 107 and 108. The resistors 107 and 108 are connected between the positive and negative lines of the secondary winding 101b. The voltage developed across the resistor 108 is determined in accordance with an instruction output from the output port 53c of the microcomputer 50. The shunt regulator 106 is in turn controlled by the voltage across the resistor 108 and thus a signal corresponding to the instruction issued from the output port 53c of the microcomputer 50 is fed via the feedback unit 105 to the switching device 102.

The switching power source is controlled to selectively provide a first output V1 and a second output V2 in response to a first instruction and a second instruction from the output port 53c, respectively. The first supply voltage generating circuit generates the first supply voltage Vcc in response to the first and second outputs V1 and V2, and the second supply voltage generating circuit generates the second supply voltage Vcc2 in response only to the second output V2. The second output V2 may be set to the second supply voltage Vcc2.

The battery charger further includes a third power supply circuit 120 for powering the PWM control IC 23. The PWM control IC 23 is enabled when powered by the third power supply circuit 120 and is disabled when unpowered by the third power supply circuit 120. The third power supply circuit 120 includes a tertiary winding 101c magnetically coupled to the primary winding 101a of the second power supply circuit 100, a diode 121 connected to the positive line of the tertiary winding 101c, and a capacitor connected across the positive and negative lines of the tertiary winding 101c. The third power supply circuit 120 powers the PWM control IC 23 when the switching power source outputs the second voltage V2 and unpowers the PWM control IC 23 when the switching power source outputs the first voltage V1.

The microcomputer 50, resistors 107-109, shunt regulator 106 and feedback unit 105 and the third power supply circuit 120 serve as a control section for controlling the first and second power supply circuits 10A and 100.

Next, a method for controlling a battery charger will be described with reference to the flowchart in FIG. 2.

When the battery charger is powered, initial settings are performed for the output ports 53a, 53b, 53c and 5.3d of the microcomputer 50, whereupon step 101 is executed. In step 101, the output of the switching power source 10A, i.e., the voltage to be applied to the regulator 111 of the first supply voltage generating circuit 10DB, is set to V1. The voltage V1 is the lowest voltage for the regulator 111 to generate the first supply voltage Vcc. Stated differently, the regulator 111 can generate the first supply voltage Vcc when applied with the voltage V1. To generate the first supply voltage Vcc, a first instruction signal is output from the output port 53c of the microcomputer 50 and is fed to the switching device 102 via the resistors 107-109, the shunt regulator 106, and the feedback unit 105. More specifically, the output port 53c is set to a high impedance level, so that the shunt regulator 106 is controlled to produce an output determined depending on the voltage at the connection node of the resistors 107 and 108, which in turn is determined by the high impedance level at the output port 53c. Thus, the feedback unit 105 applies a signal corresponding to the high impedance level appearing at the output port 53c to the switching device 102.

When the voltage V1 is generated from the switching power source 100A, the third power supply circuit 120 generates an output voltage for disabling the PWM control IC 23. Accordingly, the first power supply circuit 10A is not operated and so the battery pack 2 is not supplied with power from the first power supply circuit 10A.

Next, in step 102, the CPU 51 determines whether or not the battery pack 2 is loaded in the battery charger or connected to the connection terminals. Whether or not the battery pack 2 is loaded in the battery charger can be determined based on the voltage applied to the microcomputer 50 from the battery voltage detecting circuit 40 or on the voltage from the battery temperature detecting circuit 90.

When the CPU 51 determines that the battery pack 2 is loaded in the battery charger (S102: YES), the output of the switching power source 100A is set to V2 to generate the second supply voltage Vcc2 in the second supply voltage generating circuit 100C. At this time, the first supply voltage generating circuit 100B is also supplied with the voltage V2 greater than V1 at its input terminal, so the first supply voltage Vcc is continuously output from its output terminal. To generate the second supply voltage Vcc2, a second instruction signal is output from the output port 53c of the microcomputer 50 and is fed to the switching device 102 via the resistors 107-109, the shunt regulator 106, and the feedback unit 105. More specifically, the output port 53c is set to a low impedance level, so that the shunt regulator 106 is controlled to produce an output determined depending on the voltage at the connection node of the resistors 107 and 108, which in turn is determined by the low impedance level at the output port 53c. Thus, the feedback unit 105 applies a signal corresponding to the low impedance level appearing at the output port 53c to the switching device 102.

When the voltage V2 is generated from the second supply voltage generating circuit 100C, the third power supply circuit 120 generates an output voltage for enabling the PWM control IC 23. Accordingly, the first power supply circuit 10A is operated. The battery pack 2 can thus be charged with the power supplied from the first power supply circuit 10A when the PWM control IC 23 receives the charge start signal from the microcomputer 50. Because the voltage V2 is greater than the voltage V1, the 3-terminal regulator 111 continuously generates the first supply voltage Vcc to keep the various components in an operable condition.

Next, in step 104, the output port 53a of the microcomputer 50 is set to a high level, thereby allowing the cooling fan 8 to actuate with the second supply voltage Vcc2. Thereafter, in step S105, the charge start signal is issued from the output port 53b to the PWM control IC 23 via the photo-coupler 5c to start charging the battery pack 2 with a charge current I.

After charging the battery pack 2 is started, the microcomputer 50 determines in step 106 whether or not the battery pack 2 has reached a full charge condition. Various methods for determining the full charge condition of the battery have been well known in the art, such as $-\Delta V$ method, dT/dt method. Briefly, in the $-\Delta V$ method, the battery is determined to be fully charged when the battery voltage drops a predetermined voltage from a peak level. In the dT/dt method, the battery is determined to be fully charged when a battery temperature gradient has exceeded a predetermined value. The above and other methods for determining the full charge condition of the battery are disclosed, for example, in Japanese Patent Application Publication Nos. SHO-62-193518, HEI-2-246793, and Japanese Utility Model Application Publication No. HEI-3-34638.

When the battery pack 2 is determined that the battery pack 2 has been fully charged (S106: YES), the microcomputer 50 issues the charge stop signal to the PWM control IC 23 via the photo-coupler 5c to stop charging (step 107). When the CPU 51 determines that the battery pack 2 is unloaded from the charger (step 108: YES), the CPU 51 sets its output port 53a to a low level to deactivate the cooling fan 8 (step 109) Thereafter, the routine returns to step 101 where the output voltage of the switching power source 100A is set to the voltage V1.

As described, the battery charger in accordance with the above-described embodiment can achieve low power consumption during a standby condition.

While the invention has been described in detail with reference to a specific embodiment thereof, it would be apparent to those skilled in the art that various changes and modifications may be made therein without departing from the spirit of the invention, the scope of which is defined by the attached claims.

For example, the above-described embodiment may be modified so as to actuate the cooling fan 8 only when the battery temperature is higher than a predetermined value.

What is claimed is:

1. A battery charger comprising:
   a pair of connection terminals across which a secondary battery is connected;
   a first power supply circuit that is connected to the pair of connection terminals and supplies power to the secondary battery;
   a second power supply circuit that produces a first voltage and a second voltage, the second voltage having a value greater than a value of the first voltage;
   a first component operable when applied with the first voltage;
   a second component operable when applied with the second voltage; and
      a control section that controls both the first power supply circuit and the second power supply circuit so that the first power supply circuit is disabled but the second power supply circuit is enabled when the secondary battery is not connected across the pair of connection terminals, and that both the first power supply circuit and the second power supply circuit are enabled when the secondary battery is connected across the pair of connection terminals, wherein the second power supply circuit produces the first voltage when the secondary battery is not connected across the pair of connection terminals, and produces the second voltage when the secondary battery is connected across the pair of connection terminals;
   wherein the second power supply circuit generates the first voltage in response to a first instruction from the control section, and generates the second voltage in response to a second instruction from the control section; and
   wherein the second power supply circuit comprises:
      a switching power source controlled to selectively provide a first output and a second output in response to the first instruction and the second instruction from the control section, respectively;
      a first voltage generating circuit that generates the first voltage in response to the first and second outputs; and
      a second voltage generating circuit that generates the second voltage in response to the second output.

2. The battery charger according to claim 1, wherein the control section comprises a microcomputer wherein the second power supply circuit supplies power to the microcomputer to allow the microcomputer to operate when the secondary battery is not connected across the pair of connection terminals.

3. The battery charger according to claim 1, wherein the first voltage generating circuit comprises a 3-terminal regulator having an input terminal, output terminal, and ground terminal wherein the input terminal is connected to the switching power source and the output terminal outputs the first voltage.

4. The battery charger according to claim 1, wherein the switching power source comprises a transformer having a primary winding and a secondary winding, and a switching device connected to the control section to selectively receive the first and second instructions therefrom and also connected in series to the primary winding of the transformer so that the switching device performs on/off switching actions corresponding to the first and second instructions.

5. The battery charger according to claim 4, wherein the control section comprises a tertiary winding magnetically coupled to the primary winding of the transformer.

6. The battery charger according to claim 1, wherein the control section comprises a battery connection detecting circuit that detects the secondary battery connected across the pair of connection terminals.

7. A battery charger comprising:
   a pair of connection terminals across which a secondary battery is connected;
   a first power supply circuit that is connected to the pair of connection terminals and supplies power to the secondary battery, the first power supply circuit being enabled when powered whereas disabled when not powered;
   a first component operable when applied with a first voltage;
   a second component operable when applied with a second voltage greater than the first voltage;
   a second power supply circuit that produces the first voltage to be applied to the first component and the second voltage to be applied to the second component; and
   a third power supply circuit that does not power the first power supply circuit when the second power supply circuit produces the first voltage but powers the first power supply circuit when the second power supply circuit produces the second voltage.

* * * * *